United States Patent [19]
Tham

[11] Patent Number: 5,313,069
[45] Date of Patent: May 17, 1994

[54] DISTANCE MEASURING SYSTEM OF AN EXTENDABLE STRIP HAVING LIGHT REFLECTING AND NON-REFLECTING POLYGONS

[75] Inventor: Joo L. Tham, Sunnyvale, Calif.

[73] Assignee: Trimble Navigation, Sunnyvale, Calif.

[21] Appl. No.: 815,390

[22] Filed: Dec. 31, 1991

[51] Int. Cl.⁵ .................................... G01N 21/86
[52] U.S. Cl. ............................ 250/561; 250/237 G
[58] Field of Search ............ 250/561, 237 G, 231.13, 250/231.14, 214 C, 238; 356/375

[56] References Cited

U.S. PATENT DOCUMENTS

| | | | |
|---|---|---|---|
| 4,238,795 | 12/1980 | Schiek et al. | 343/14 |
| 4,788,441 | 11/1988 | Laskowski | 250/561 |
| 4,829,305 | 5/1989 | LaBudde | 342/127 |
| 4,906,854 | 3/1980 | Rauh et al. | 250/237 G |
| 4,908,648 | 3/1990 | Sawabe et al. | 354/403 |
| 4,935,635 | 6/1990 | O'Hara | 250/560 |

*Primary Examiner*—David C. Nelms
*Assistant Examiner*—T. Davenport
*Attorney, Agent, or Firm*—John Schipper

[57] ABSTRACT

Apparatus for determining the distance, accurate to within an error of no more than 1 mm, from a first position to a second position. The apparatus includes a distance marker that includes a first strip having a sequence of uniformly spaced light-reflecting (or light-transmitting) regions in one embodiment and includes a second strip having a sequence of uniformly spaced light-reflecting (or light-transmitting) regions, the two strips being positioned parallel and adjacent to each other with the positions of the light-reflecting (or light-transmitting) regions of the first strip being translated relative to the positions of the light-reflecting (or light-transmitting) regions of the second strip by a fixed translation distance. The apparatus also includes a light sensor positioned adjacent to the strip to sense each such light-reflecting region (or light-transmitting region) and/or each non-reflecting region (or non-transmitting region) as that region moves past the light sensor. When the strip is extended to measure the distance from the first position to the second position, the number of light-reflecting (or light-transmitting) regions and/or non-reflecting (or non-transmitting) regions moving past the light sensor is counted to determine the distance. When the extended portion of the distance marker is reduced in length, the counting process is reversed to determine a new distance. The number of strips on the distance marker can be increased to $N \geq 3$ for improved distance measurement accuracy.

18 Claims, 9 Drawing Sheets

FIG._15

DISTANCE MEASURING SYSTEM OF AN EXTENDABLE STRIP HAVING LIGHT REFLECTING AND NON-REFLECTING POLYGONS

FIELD OF THE INVENTION

This invention relates to measurement of distances by electronic instruments.

BACKGROUND OF THE INVENTION

In many fields of activity, such as surveying, construction and navigation, accurate measurement of short and medium size distances, generally no more than 100 meters is needed. The required accuracy will vary with the activity. In some activities such as global surveying and navigation, distance measurement that is accurate to within a fraction of a millimeter (mm) is required for purposes of initial positioning.

Several non-contact distance measurement schemes have been proposed by workers in this field. One approach is frequency modulation/phase detection, which can be used over distances as large as 100 meters with a distance uncertainty, about 3,000 parts per million over the full measurement range. The accuracy obtainable is often limited by phase shift due to the dynamic range of the signals received. The full measurement range is often limited to 1 meter in order to obtain measurements accurate to within 1 mm. Schiek et al, in U.S. Pat. No. 4,238,795, disclose a microwave range measuring device in which microwaves are emitted at a first frequency, then at a second frequency, and are reflected from the object whose distance is to be determined. The reflected waves return to and are sensed by the device to determined the distance. A medium distance measuring device, disclosed by Budde in U.S. Pat. No. 4,829,305, also uses return of reflected microwaves from a target to determine the distance from the device to the target.

Optical triangulation of position is another attractive approach, possibly allowing distance measurements that are accurate to within a fraction of a millimeter over a modest distance range. This approach requires emission of a collimated beam from a reference position and determination of the distance by use of geometrical calculations based upon measurements of angles of reflection of the beam at the object. Sawabe et al, in U.S. Pat. No. 4,908,648, disclose use of radiation transmitted toward and reflected by the target, using two radiation signals that can overlap in space or in time. Resolution is very much dependent upon the distance measured and becomes monotonically worse as the distance increases. Further, the emitted beam would need to be modulated to insure immunity from changes in ambient conditions.

What is needed is apparatus for distance measurements that is good to within a millimeter or a fraction thereof, that does not require use of complex, movement-sensitive optical and electronics components, that provides approximately the same accuracy over the entire measurement range, that takes account of changing ambient temperature, that requires no recalibration at subsequent times, and that is compact and rugged enough for field work.

SUMMARY OF THE INVENTION

These needs are met by the invention, which provides an electronic tape measurement system that may be constructed with an inaccuracy as small as a fraction of a millimeter over measured distances as great as tens of meters. In one embodiment, the system includes a distance marker, such as an optically reflecting tape, that extends in a longitudinal direction with two parallel strips, each containing a sequence of length indicia. The length indicia consist of light reflecting regions alternating with regions that reflect little or no light. The alternating light-reflecting and non-reflecting regions in each sequence are spaced apart by a uniform distance d, such as 2 mm, and the positions of the light-reflecting regions in one sequence partly, but not completely, overlap the light-reflecting regions in the other sequence. This distance marker is extended from an initial position to determine the distance between two positions. As the tape is extended, the tape moves through a light sensing instrument that directs light at a small region on each of the two strips on the tape and senses and counts the number of length indicia from each of the two sequences that pass through the scanning instrument as the marker is extended (or contracted).

In one embodiment, signals produced and issued by the optical scanning instrument for the two sequences are received by two peak detector-comparator combinations that determine whether the light sensor signal produced by each strip is presently high or low. The number of light-reflecting and/or non-reflecting regions that pass the light sensor as the distance marker moves is counted for each of the two sequences, and the counts are compared to determine how far the distance marker has been extended or contracted, with a distance error of no more than d/2. The counting of light-reflecting regions that pass the light sensor can be done in hardware or in software, and an embodiment for each of these is disclosed.

DETAILED DESCRIPTION

Figure 1:
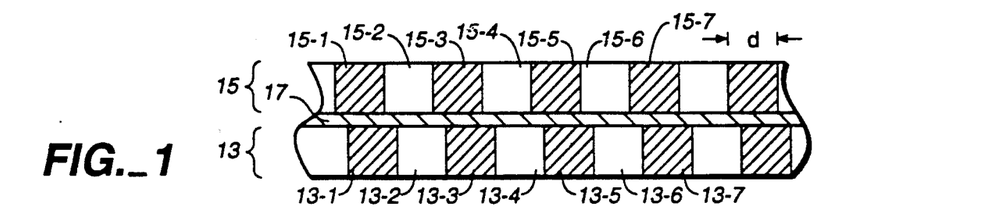
FIG. 1 is a top view of a portion of a distance marker constructed according to a first embodiment of the invention.
Figure 2A:
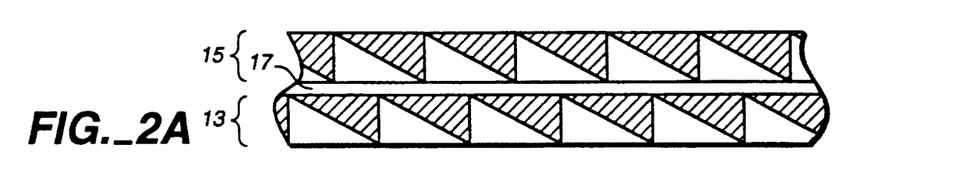
FIGS. 2A, 2B and 2C illustrate other shapes, namely triangles, trapezoids and ovals, that can be used for the light-reflecting regions and non-reflecting regions according to the invention.
Figure 2B:
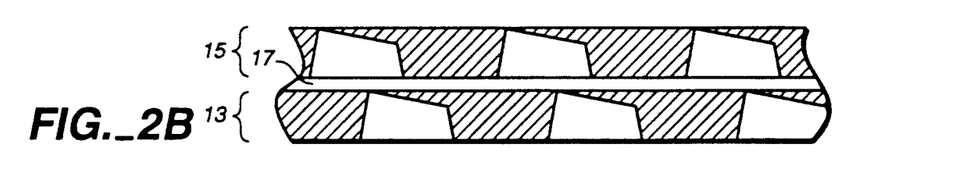
Figure 2C:
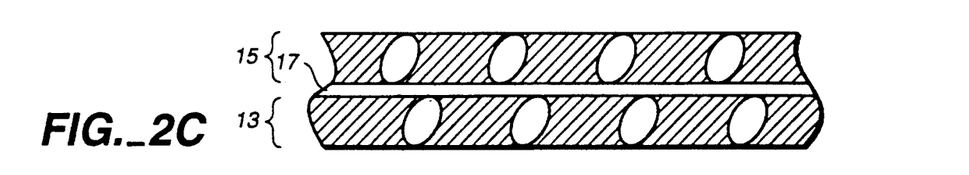

FIG. 1 illustrates a top view of a first embodiment of a portion of a distance marker 11 constructed according to the invention. The distance marker 11 includes a first and second parallel strips 13 and 15, separated by a thin strip 17 (optional) of material that is not light reflecting, in order to help isolate the two strips 13 and 15. The thickness of the thin strip is not critical, and it may be narrow or wide relative to the widths of the two parallel strips 13 and 15. The first strip 13 includes a first sequence 13-1, 13-3, 13-5, 13-7, etc. of rectangles or other suitable polygonal or ovular shapes, such as triangles, quadrilaterals and ovals, (all referred to as "Polygons" herein) that are non-reflecting for light incident on the marker 11 from the top or the bottom thereof. The first strip 13 also includes second sequence 13-2, 13-4, 13-6, etc. of Polygons that are highly reflecting for light incident from the top or the bottom of the marker 11. The second strip 15 includes a third sequence 15-1, 15-3, 15-5, 15-7, etc. of non-reflecting Polygons and a fourth sequence 15-2, 15-4, 15-6, etc. of light-reflecting Polygons. The light-reflecting Polygons have approximately the same area as, and preferably but not necessarily the same shape as, the non-reflecting Polygons. The non-reflecting Polygons and the light-reflecting Polygons are used together to determine the distance of extension of the distance marker 11. FIGS. 2A, 2B and 2C illustrate some other shapes of light-reflecting Polygons and non-reflecting Polygons that can be used with the invention.

A Polygon, such as 15-3, in the third sequence in the second strip 15 is positioned so that it "overlaps", in a sense illustrated in FIG. 1, a nearest Polygon 13-3 from the first sequence of the first strip 13 and overlaps another nearest Polygon 13-2 from the second sequence of the first strip 13. Preferably, the amount of overlap of the Polygon 15-3 with each of the two Polygons 13-2 and 13-3 is equal in this embodiment. In a similar manner, a Polygon, such as 15-4, in the fourth sequence of the second strip 15 is positioned so that this Polygon 15-4 overlaps a nearest Polygon 13-4 from the second sequence of the first strip 13 and overlaps another nearest Polygon 13-3 from the first sequence of the first strip 13, preferably by equal amounts. Each Polygon 13-i is assumed to be spaced apart from the Polygons 13-(i−2) and 13-(i+2) by a first center-to-center distance (i=3, 4, 5, ...); and each Polygon 15-i is assumed to be spaced apart from the Polygons 15-(i−2) and 15-(i+2) by a second center-to-center distance. The Polygons themselves may be any size, consistent with the requirements for sensing of reflected light from the light reflecting Polygons on each strip 13 and 15. For convenient reference, in this first embodiment the Polygons in the first and second strips 13 and 15 are assumed to have the same diameter d, measured in the direction of extension of the distance marker.

Assume that a first narrow slit of light of width $w<d/2$ is directed at the first strip 13 and a second narrow slit of light of width $w<d/2$ is aligned with the first slit and directed at the second strip 15. If the light produced by these slits is received at the surface of the distance marker 11, either (1) light from the first slit will be reflected and/or light from the second slit will not be reflected, or (2) light from the first slit will not be reflected and/or light from the second slit will be reflected, depending upon where the first and second slits are positioned along the distance marker 11. The two slits of light may be combined into a single slit extending across the two strips 13 and 15, if desired. Thus, if the distance marker 11 is moved past a two-slit light scanner or other suitable light sensing instrument to measure a distance from a first position to a second position, the scanner will count the number of transitions from reflecting to non-reflecting ("light-to-dark"), and from non-reflecting to reflecting ("dark-to-light") that occur in each of the first and second strips 13 and 15. At any given position along the distance marker, a first light sensor and a second light sensor will independently sense the presence or absence of light reflected from the first strip 13 and the second strip 15, respectively. Comparing the number of transitions sensed and the presence or absence of reflected light at the scanner for each of the two slits, the position of the distance marker can be determined within a distance $\Delta x \leq d/2$, because of the overlap of the Polygons in the first and second strips. The two light-producing slits need not be aligned with one another; the slits may be positioned a distance $\Delta x = 2Nd$ apart along the distance marker 11, where N is an integer, in the embodiment of FIG. 1. If the light reflecting Polygons and non-reflecting Polygons on one (but not both) of the strips are exchanged with one another, the distance $\Delta x$ becomes $\Delta x = (2N-1)d$.

Figure 3A:
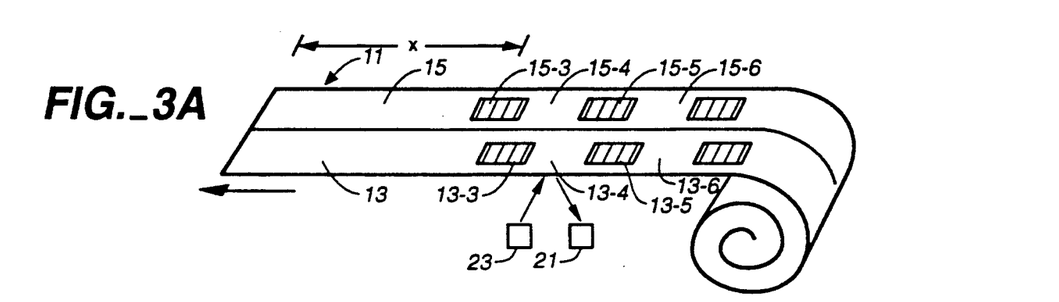
FIGS. 3A and 3B are perspective views illustrating use of the distance marker together with an associated electronic sensing module in reflection and transmission modes, respectively.

FIG. 3A illustrates use of the distance measuring unit in the embodiment of FIG. 1, using reflection of light from light reflecting Polygons of the distance marker 11, such as 13-4 and 13-6. As the distance marker 11 is extended in the direction of the arrow, the measured distance x increases, and the change in this distance x is monitored by a light sensing means 21 that receives light produced by a light source 23 and reflected by the light-reflecting Polygons on each strip of the distance marker 11. The electrical signals produced at the light sensor 21 for each of the strips 13 and 15, as the Polygons move past the sensor, are passed to a signal processing module 31 that is illustrated in more detail in FIG. 4. The embodiment shown in FIG. 3A uses reflected light to alternatingly activate and not activate certain phototransistors in certain optical switches shown in FIG. 4. In the embodiment shown in FIG. 3A, the light sensor 21 and light source 23 are positioned on the same side of the distance marker 11.

Figure 3B:
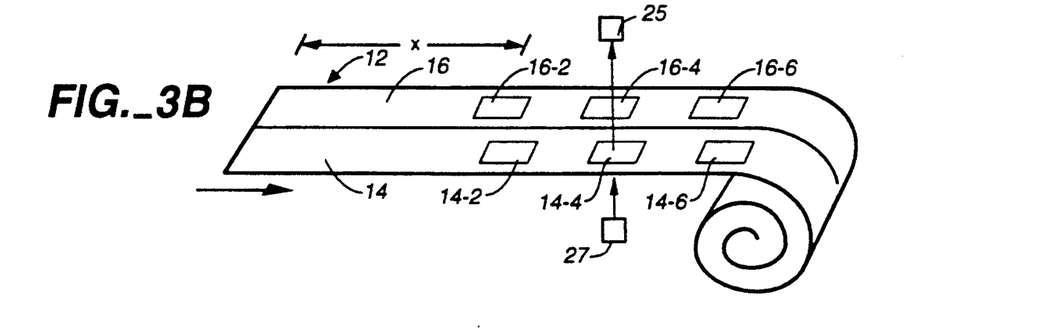

In an alternative embodiment, illustrated in FIG. 3B, the two adjacent strips 13 and 15 of the distance marker 11 are replaced by two adjacent strips 14 and 16, respectively; of a distance marker 12, the light-reflecting Polygons 13-2, 13-4, 13-6, etc. are replaced by cut-out Polygons or apertures 14-2, 14-4, 14-6, etc.; and the light-reflecting Polygons 15-2, 15-4, 15-6, etc. are replaced by cut-out Polygons or apertures 16-2, 16-4, 16-6, etc. A light sensor 25 is positioned on one side of the distance marker 12 and a light source 27 is positioned on a second side of the distance marker 12, both devices being adjacent to the strip 14. A light sensor and light source (not shown in FIG. 2B) are similarly positioned adjacent to the strip 16. Light emitted by the source 27 passes through a cut-out Polygon, such as 14-4, and is received by the light sensor 25 when that cut-out Polygon lies between the light source 27 and the light source 25. When a non-cut-out Polygon, such as 14-5, lies between the light source 27 and the light sensor 25, no light from the source is received by the light sensor 25, assuming that the light source 27 is contained in an appropriate housing (not shown in the interests of clarity) that absorbs or shields most of the light and allows light to exit from the housing only through an aperture in the distance marker 12.

The embodiments of FIGS. 3A and 3B rely upon light reflection and upon light transmission, respectively, at the distance marker. In the embodiment of FIGS. 3A or 3B, the amount of light received by a light sensor from a light source undulates between minimum and maximum values as the distance marker 11 or 12 is extended in a first longitudinal direction in the direction of the arrow in FIG. 3A (coordinate x increasing) or is contracted in a second longitudinal direction that is opposite to the first longitudinal direction (coordinate x decreasing), as indicated by the arrow direction in FIG. 3B.

Figure 4:
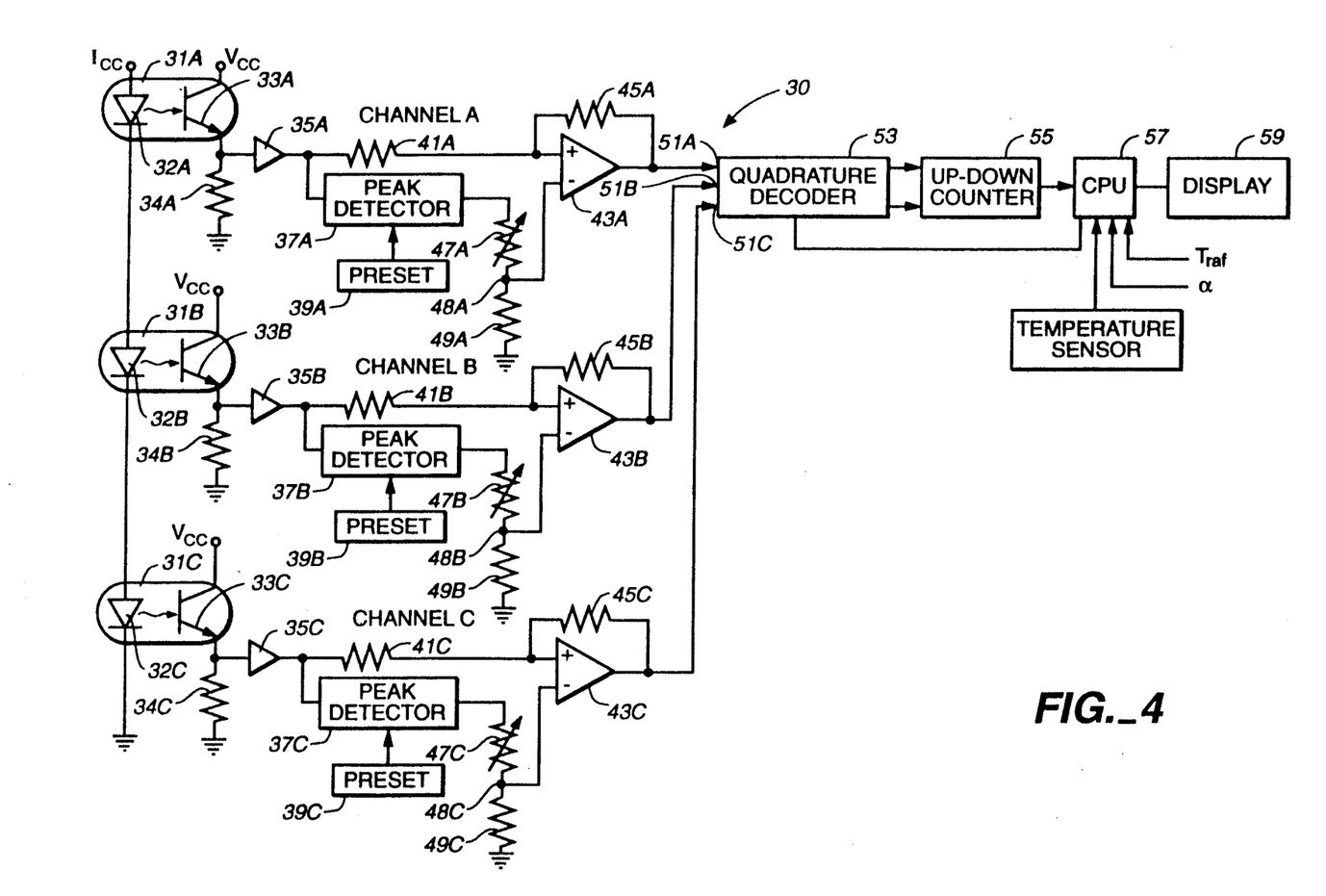
FIG. 4 is a schematic view of an electronic signal processing module or circuit, constructed according to the invention, to sense the length indicia, and count the number thereof, on the distance marker of FIG. 1 or FIG. 12 that pass a given point.

FIG. 4 illustrates an embodiment 30 of an electronic circuit according to the invention that is suitable for sensing and counting the number of light-to-dark and dark-to-light transitions in both channels that occur as the distance marker is extended to measure a distance. The light-dark pulses from these transitions are produced at first, second and third substantially identical optical switches 31A, 31B and 31C, including the respective light sources 32A, 32B and 32C and the respective phototransistors 33A, 33B and 33C, each light source having a predetermined current source, denoted $I_{cc}$. The amount of charge flowing at a particular instant of time in each of the phototransistors 33A, 33B and 33C increases with the amount of light incident upon the device. A resistor 34A connected between ground voltage and an emitter of the phototransistor 33A converts the output signal from the phototransistor 33A to a voltage signal, and this voltage is amplified by an amplifier 35A. The amplified voltage signal from the amplifier 35A is received by a peak detector 37A that detects and stores the most recently received peak voltage value, until this peak value is replaced by a subsequently received peak value. Optionally, the peak detector 37A can be preset to an initial value, at the time of system power-up, by a presetting module 39A. The amplified voltage signal issued by the amplifier 35A is also passed through a second resistor 41A to the non-inverting input terminal of an operational amplifier or comparator 43A. The comparator is arranged in a positive feedback loop, with the output terminal thereof being connected to the non-inverting terminal through a third resistor 45A to provide hysteresis.

The peak detector 37A issues an output signal, representing the most recently received peak voltage value, and this peak output signal is received by an input terminal of a potentiometer 47A, then passed from an output terminal of the potentiometer through a fourth resistor 49A to ground. In a first alternative, the fourth resistor 49A may be deleted and the potentiometer 47A may be set to produce a selected voltage issued at a third terminal of the potentiometer and received at the inverting terminal of the comparator 43A. The potentiometer 47A and the fourth resistor 49A form a voltage ladder that can be used to adjust the voltage appearing at a node 48A between the potentiometer 47A and the fourth resistor 49A. In a second alternative, the potentiometer 47A can be replaced by a fifth resistor or other resistive means, if no adjustment of the voltage appearing at the node 48A is required. The voltage signal appearing at the node 48A is received at an inverting terminal of the comparator 43A. A comparator output signal, corresponding to the voltage difference between the signals received at the non-inverting and inverting terminals of the comparator 43A, is issued at the output terminal of the comparator 43A and is received by a first input terminal 51A of a quadrature detector 53. This completes the processing of an input signal by channel A, which includes the phototransistor 33A, the first resistor 34A, the amplifier 35A, the peak detector 37A, the preset module 39A, the second resistor 41A, the comparator 43A, the third resistor 45A, the potentiometer (or other resistive means) 47A, the fourth resistor 49A and the first input terminal 51A.

In a similar manner channel B includes an optical switch 31B (light source 32B and phototransistor 33B), a first resistor 34B, an amplifier 35B, a peak detector 37B, a preset module 39B, a second resistor 41B, a comparator 43B, a third resistor 45B, a potentiometer (or other resistive means) 47B, a fourth resistor 49B and a second input terminal 51B, which operate in the same manner as the optical switch 31A, the first resistor 34A, the amplifier 35A, the peak detector 37A, the preset module 39A, the second resistor 41A, the comparator 43A, the third resistor 45A, the potentiometer (or other resistive means) 47A, the fourth resistor 49A and the input terminal 51A, respectively, of channel A.

Figure 13:
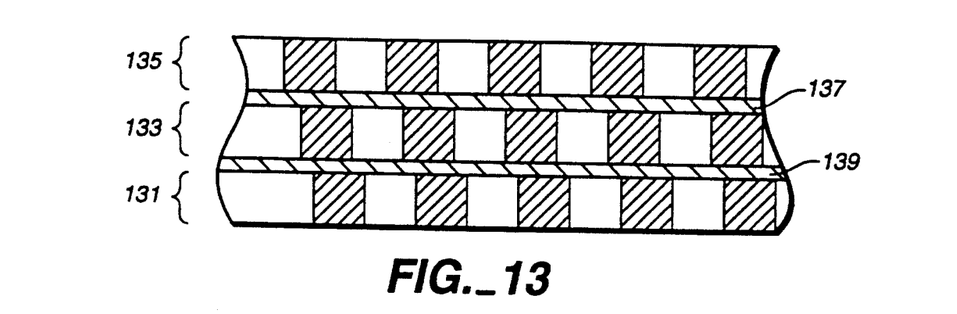
FIG. 13 is a schematic view of a three-strip distance marker for another embodiment of the invention.

The C channel, includes an optical switch 31C (light source 32C and phototransistor 33C), a first resistor 34C, an amplifier 35C, a peak detector 37C, a preset module 39C, a second resistor 41C, a comparator 43C, a third resistor 45C, a potentiometer (or other resistive means) 47C, a fourth resistor 49C and a second input terminal 51C, is not present or operative in the embodiment corresponding to the distance marker shown in FIG. 1 but is present in the embodiment corresponding to the distance marker shown in FIG. 13, discussed below.

Voltage signals $V_A(t)$ and $V_B(t)$ are received more or less continuously by a quadrature decoder 53 at the first and second input terminals 51A and 51B, respectively. The quadrature decoder 53 compares the transition signals being received at each input terminals 51A and 51B and determines if the extension distance of the marker is increasing or decreasing, by a hardware approach or by a software approach, as discussed below in more detail. The extension distance information (increase/decrease) is passed from the quadrature decoder 53 to an up/down counter 55 that counts the number of transitions and passes this information to a central processing unit or CPU 57 of a computer. The present position of the distance marker is then determined by the CPU 57 and is passed to a visual monitor or other visually perceptible display means for display of the present distance. The quadrature decoder 53 also issues an error signal on a separate line 61, and this error signal is received by the CPU 57 at a second input terminal, to advise the CPU that the quadrature decoder 53 has detected a non-valid transition in signals received from the two phototransistors 33A and 33B. Generation of this error signal is discussed below in more detail. Optionally, the CPU 57 may receive ambient temperature information from a temperature sensor module 63, in order to determine the temperature-corrected length $L_c$ of a given section of the distance marker 11 in FIG. 1 whose measured length $L_u$ is determined by the CPU 53 without reference to any change in temperature from a reference temperature $T_{ref}$. The temperature-corrected length $L_c$ is determined by the relation $$L_c = L_u[1 + \alpha(T - T_{ref})], \quad (1)$$

where $\alpha$ is the thermal linear expansion coefficient of the material used for the distance marker 11 in FIG. 1. Optionally, chosen values of the parameters $\alpha$ and/or $T_{ref}$ can be provided at two input terminals of the CPU 57.

In a preferred mode of the invention, the first, second, third and fourth resistors 34A, 41A, 45A and 49A of channel A (and, similarly, the corresponding resistors 34B, 41B, 45B and 49B of channel B and the corresponding resistors 34C, 41C, 45C and 49C of channel C) have the respective resistance values 4.64, 5.11, 511 and 348 kilo-ohms and the power supply voltage $V_{cc}$ for the comparators 43A, 43B and 43C is 5 volts to be compatible with circuitry in the quadrature decoder 53.

The circuit 31 shown in FIG. 4 includes a processing module that performs quadrature decoding and pulse counting. The phototransistor modules 33A and 33B convert a light beam reflected by the respective strips 13 and 15 of the distance marker 11 into signal currents. The optimum distance from a strip 13 or 15 to the corresponding light receiving surface of the phototransistor 33A or 33B is 0.8 mm in this embodiment, but the distance used in operation of the invention may be greater or less than the optimum distance. Preferably, the light receiving surfaces of the phototransistors that receive the reflected light beams from the Polygons that form the strips 13 and 15 are oriented for maximum sensitivity relative to these Polygons.

The currents produced by the phototransistors 33A and 33B are ultimately converted into voltage signals for the respective comparators 43A and 43B. If, say, the light receiving surface of the phototransistor 33A is directly over a "light" Polygon such as 13-2 in FIG. 1, the voltage produced at the non-inverting input terminal of the comparator 43A will exceed the threshold voltage $V_{thr}$ produced at node 48A, and the output voltage signal of the comparator 43A will pull high. At the same time, the light receiving surface of the phototransistor 33B may be directly over a "dark" Polygon, such as 15-3 or directly over a "light" Polygon, such as 15-2, producing a low output voltage or a high output voltage, respectively, at the output terminal of the comparator 43B. As the distance marker 11 shown in FIG. 1 moves past the light receiving surfaces of the two phototransistors 33A and 33B in FIG. 4, the output voltage signals from the two comparators 43A and 43B will alternatingly pull high and pull low, being out of synchronism with one another by a time $\tau = d/2w$, where w is the rate of change of distance extension of the distance marker 11. The distance moved by the distance marker may thus be determined to within an error of no more than d/2. Increasing the resistance values of the first resistors 34A and 34B of channels A and B would increase the effective gain of the respective amplifiers 35A and 35B but would decrease the bandwidths of the phototransistors 33A and 33B. For the resistance values chosen in the preferred mode for the first resistors 34A and 34B, the bandwidths of the phototransistors 33A and 33B are each around 5 KHz. If the Polygon widths d on the distance marker (FIG. 1) are chosen as 2 mm, a 5 KHz signal corresponds to movement of the distance marker past the phototransistors at a theoretical maximum rate of 20 M/sec, which is much faster than any velocity contemplated for the distance marker. Thus, the available bandwidth of the phototransistors should not be a problem.

Figure 5:
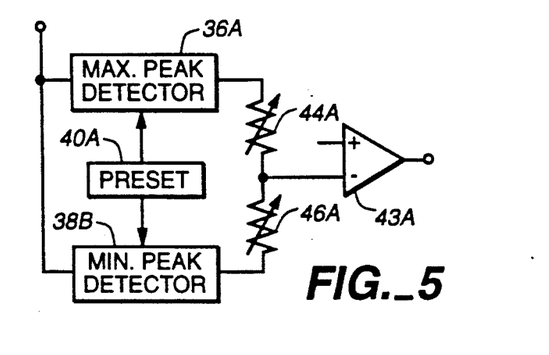
FIGS. 5 and 6 are schematic views of alternative arrangements of the peak detector portion of the invention shown in FIG. 4.

FIG. 5 illustrates an alternative arrangement of the peak detector portion of Channel A in the embodiment shown in FIG. 4. The peak detector 37A in FIG. 4 is replaced by a maximum peak detector 36A and a minimum peak detector 38A, both of which are optionally preset by a preset module 40A as shown in FIG. 5. The maximum peak detector 36A detects and holds the most recently received maximum value of a sequence of maximum peaks, and the minimum peak detector 38A detects and holds the most recently received minimum value of a sequence of minimum peaks. Normally, each two consecutive maximum peaks are separated by a minimum peak, and each two consecutive minimum peaks are separated by a maximum peak. The output signal from the maximum peak detector 36A and the output signal from the minimum peak detector 38A are received at a first terminal of a potentiometer 44A and at a first terminal of a potentiometer 46A, respectively, with a second terminal of each potentiometer 44A and 46A and an inverting input terminal of a comparator 43A being connected together, as illustrated in FIG. 5. The peak detector portion(s) of channel B (and of channel C) in FIG. 4 may similarly be replaced by a maximum peak detector and a minimum peak detector, arranged in parallel as in FIG. 5. For each channel A and B, a sequence of maximum voltage peaks and a sequence of minimum voltage peaks is generated. Two consecutive maximum (or minimum) voltage peaks of channel A are separated by a maximum (or minimum) voltage peak of channel B and two consecutive maximum (or minimum) voltage peaks of channel B are separated by a maximum (or minimum) voltage peak of channel A. Thus, four sets of voltage cycles occur, a maximum sequence for each of channels A and B and a minimum sequence for each of channels A and B.

Figure 6:
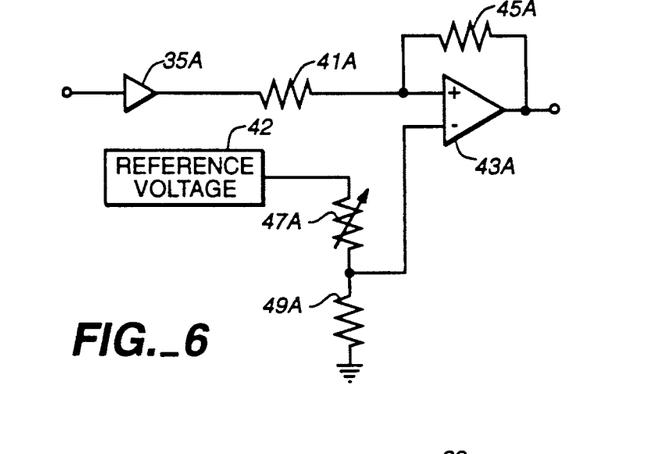

The peak detector 37A and preset module 39A in FIG. 4 may be replaced by a reference voltage source 42 whose output voltage is received by one terminal of the variable resistor 47A, as illustrated in FIG. 6. The output signal of the comparator 43A goes high or low, depending upon the sign of the voltage difference between the output signal from the amplifier 35A and an offset voltage signal at node 48A. This offset voltage is a controllable fraction of the reference voltage from the source 42.

The quadrature decoder 53 in FIG. 4 receives the voltage signals $V_A(t)$ and $V_B(t)$ and receives and stores the voltage signals $V_A(t-\Delta t)$ and $V_B(t-\Delta t)$, each of which is either high (=1) or low (=0), indicating that the corresponding light sensor is receiving or is not receiving light reflected from one of the Polygons on the corresponding strip 13 or 15 in the distance marker 11 in FIG. 1. The quadrature decoder 53 forms the logical variables $V_u(t) = [V_A(t) \oplus V_B(t-\Delta t)^*] \cdot [V_A(t-\Delta t) \oplus V_B(t)]$ and $V_d(t) = [V_A(t) \oplus V_B(t-\Delta t)] \cdot [V_A(t-\Delta t)^* \oplus V_B(t)]$, where the time interval length $\Delta t$ is predetermined and may be as short as $\Delta t = 50$ μsec. The length $\Delta t$ of this time interval limits the maximum time rate of change of extension of the distance marker to at most $d/2\Delta t$, if this ratio is less than 2 Bd, where B is the smaller of the bandwidths of the phototransistors 33A and 33B. The logical variable $V_u(t)=1$ if the distance marker length is increasing and $V_u(t)=0$ if the distance marker length is not increasing. The logical variable $V_d(t)=1$ if the distance marker length is decreasing and $V_d(t)=0$ if the distance marker length is not decreasing. The only three "legal" possibilities at any time t are $(V_u(t), V_d(t))=(0,0)$, $(1,0)$ and $(0,1)$. The state $(1,1)$ is not a legal condition or possibility and presence of this state indicates that the system is operating erroneously. Illegal transitions for this configuration are $(0,0) \ldots (1,1)$ and $(1,0) \ldots (0,1)$. An optional error signal $V_e(t)=[V_A(t)\oplus V_A(t-\Delta t)]\cdot[V_B(t)\oplus V_B(t-\Delta t)]$ may be computed and passed from the quadrature decoder 53 to the CPU 57 to sense the presence of skipped pulses.

Figure 7A:
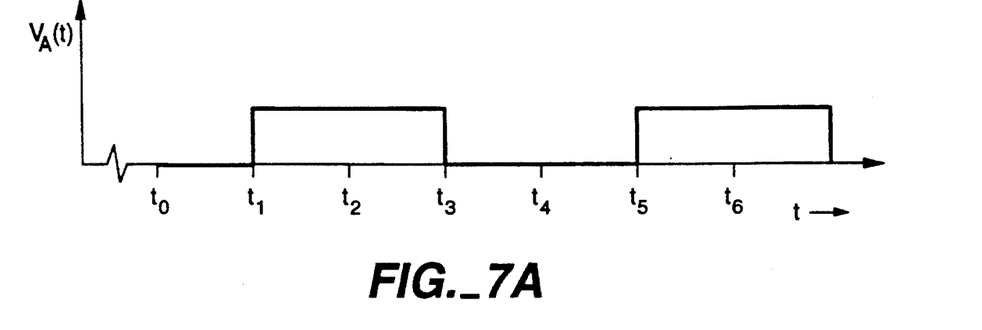
FIGS. 7A and 7B are graphical views of the signals $V_A(t)$ and $V_B(t)$ that would be processed by the module in FIG. 4 if the length of the distance marker is being extended.
Figure 7B:
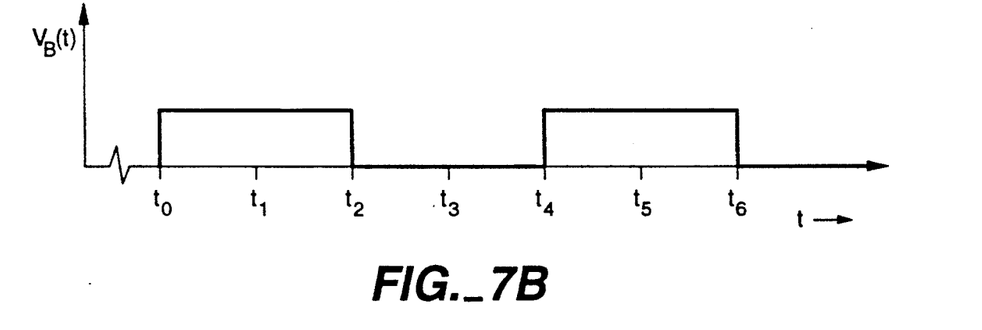

FIGS. 7A and 7B illustrate the time variation of the functions $V_A(t)$ and $V_B(t)$, where the length of the distance marker 11 in FIG. 1 is assumed to be increasing at a uniform rate $u << d/\Delta t$ for convenience of representation, and channels A and B correspond to the strips 13 and 15, respectively. The function $V_A(t)$ lags the function $V_B(t)$ by a time interval of length $\Delta t_{BA}=t_1-t_0=t_2-t_1=t_3-t_2=t_4-t_3$, and it is assumed that $\Delta t_{BA}>\Delta t$. By a consideration of cases, one easily verifies that $$V_u(t) = [V_A(t) \oplus V_B(t-\Delta t)^*] \cdot [V_A(t-\Delta t) \oplus V_B(t)] \quad (2)$$
$$= 1 \quad t_i < t < t_i + \Delta t \: (i = 0, 1, 2, 3)$$
$$= 0 \quad t_i + \Delta t < t < t_{i+1},$$

$$V_d(t) = [V_A(t) \oplus V_B(t-\Delta t)] \cdot [V_A(t-\Delta t)^* \oplus V_B(t)] \quad (3)$$
$$= 0 \quad \text{for all } t,$$

$$V_e(t) = [V_A(t) \oplus V_A(t-\Delta t)] \cdot [V_B(t) \oplus V_B(t-\Delta t)] \quad (4)$$
$$= 0 \quad \text{for all transitions } (0,0) \text{---} (0,1) \text{ or } (1,0)$$
$$\quad (0,1) \text{---} (0,0) \text{ or } (1,1)$$
$$\quad (1,0) \text{---} (0,0) \text{ or } (1,1)$$
$$\quad (1,1) \text{---} (0,1) \text{ or } (1,0)$$

$$V_e(t) = 1 \quad \text{for all transitions } (0,0) \text{---} (1,1) \quad (5)$$
$$\quad (1,0) \text{---} (0,1)$$

When the length of the distance marker 11 in FIG. 1 is decreasing, the function $V_A(t)$ leads the function $V_B(t)$ by the same time interval $\Delta t_{BA}=t_1-t_0$. This may be formally achieved by exchanging $V_A(t)$ and $V_B(t)$ and also exchanging $V_A(t-\Delta t)$. By making these exchanges in Eqs. (2) and (3), one verifies that $$V_u(t) = 0 \quad \text{for all } t \quad (6)$$

$$V_d(t) = 0 \quad t_i + \Delta t < t < t_{i+1} \quad (7)$$
$$= 1 \quad t_i < t < t_i + \Delta t.$$

Figure 7C:
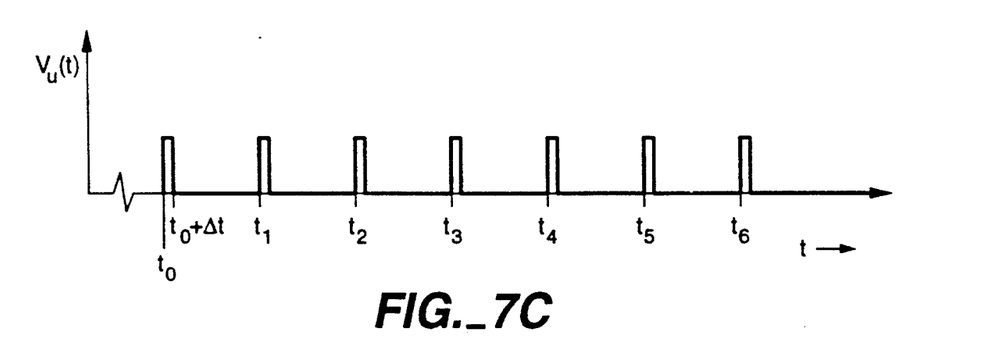
FIGS. 7C and 7D are graphical views illustrating the signals $V_u(t)$ and $V_d(t)$, respectively, that would be generated by the module in FIG. 4 if the length of the distance marker is increasing and decreasing, respectively.
Figure 7D:
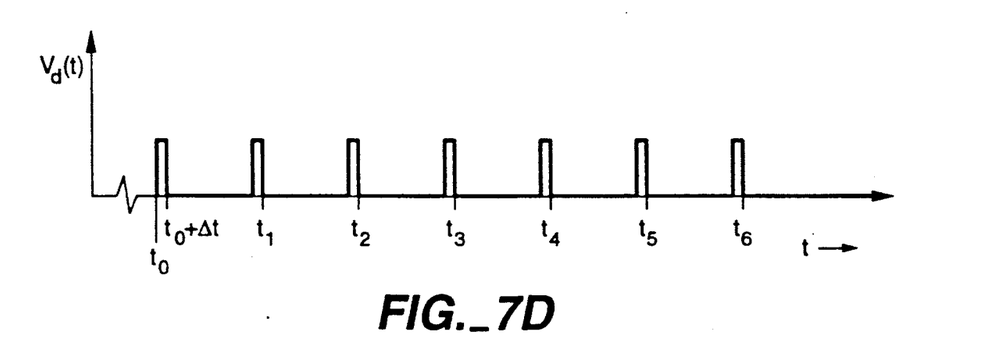

FIGS. 7C and 7D graphically illustrate the time variation of the respective functions $V_u(t)$ and $V_d(t)$ where the length of the distance marker 11 in FIG. 11 is increasing and decreasing, respectively. If the length of the distance marker 11 is increasing with increasing time, the function $V_d(t)$ will be identically zero and the function $V_u(t)$ will differ from zero only during certain time intervals $t_i<t<t_i+\Delta t$. In a similar manner, if the length of the distance marker 11 is decreasing with increasing time, the function $V_u(t)$ is identically zero and the function $V_d(t)$ differs from zero only during certain time intervals $t_i<t<t_i+\Delta t$.

Figure 8:
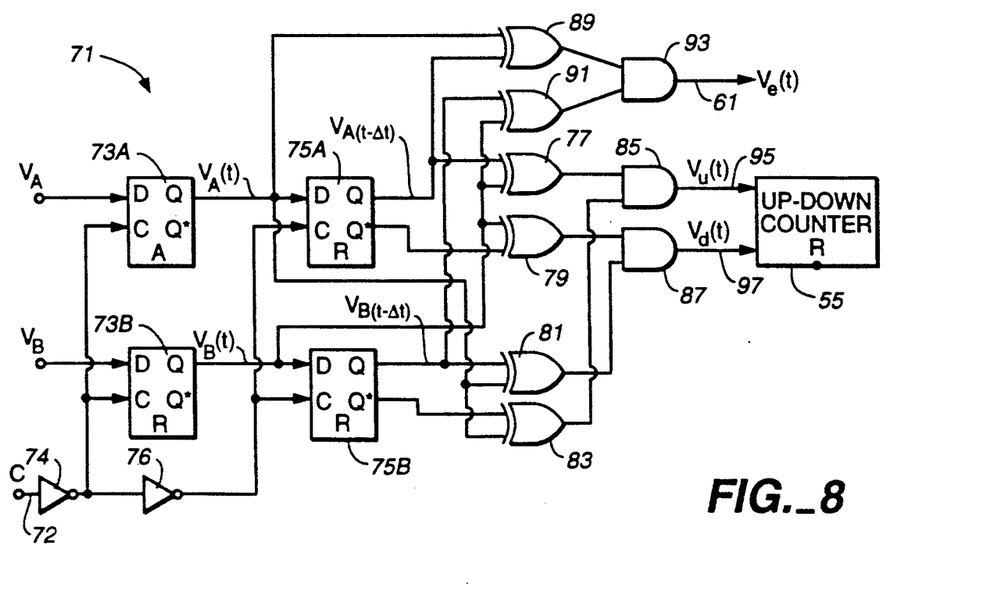
FIGS. 8, 9 and 10 are schematic views of the quadrature decoder shown in FIG. 4 for use of two adjacent strips, implemented in hardware, hardware and software, respectively, according to the invention.

FIG. 8 illustrates a hardware embodiment 71 of the quadrature encoder 53 shown in FIG. 4. Time varying signals $V_A$ and $V_B$ are received at the input terminals of first and second latch type flipflops 73A and 73B, respectively. These flipflops may be D type or any other type that allows latching of an input signal until a subsequent clock pulse CP is received. A sequence of periodic clock pulses CP(t), with period $\Delta t$, is received on a clock pulse line 72 and is passed through a first signal inverter 74, with the inverted clock output signal from the first inverter 74 being received at the clock input terminals of the flipflops 73A and 73B. The inverted clock output signal from the first inverter 74 is passed through a second signal inverter 76, and the output signal from the second inverter 76 is passed to the clock input terminals of third and fourth flipflops 75A and 75B. The input terminals of the flipflops 75A and 75B receive the non-inverted output signals $V_A(t)$ and $V_B(t)$ from the non-inverting output terminals of the first and second flipflops 73A and 73B and issue the non-inverted output signals $V_A(t-\Delta t)$ and $V_B(t-\Delta t)$ and the inverted output signals $V_A(t-\Delta t)^*$ and $V_B(t-\Delta t)^*$.

A first Exclusive OR ("EX-OR") gate 77 receives the output signals $V_A(t-\Delta t)$ and $V_B(t)$ from the flipflops 75A and 73B at its two input terminals and forms and issues the output signal $V_1(t)=[V_A(t-\Delta t)\oplus V_B(t)]$ at its output terminal. A second EX-OR gate 79 receives the output signals $V_A(t-\Delta t)^*$ and $V_B(t)$ from the flipflops 75A and 73B at its two input terminals and forms and issues the output signal $V_2(t)=[V_A(t-\Delta t)^*\oplus V_B(t)]$ at its output terminal. A third EX-OR gate 81 receives the output signals $V_A(t)$ and $V_B(t-\Delta t)$ from the flipflops 73A and 75B and forms and issues the output signal $V_3(t)=[V_A(t)\oplus V_B(t-\Delta t)]$ at its output terminal. A fourth EX-OR gate 83 receives the output signals $V_A(t)$ and $V_B(t-\Delta t)^*$ from the flipflops 73A and 75B at its output terminals and forms and issues the output signal $V_4(t)=[V_A(t)\oplus V_B(t-\Delta t)^*]$ at its output terminal. A first two-input AND gate 85 receives the signals $V_1(t)$ and $V_4(t)$ at its two input terminals and forms and issues at its output terminal the inverted product $V_5(t)=V_1(t) V_4(t)=V_u(t)$, which is the up-count signal. A second two-input AND gate 87 receives the two signals $V_2(t)$ and $V_3(t)$ at its two input terminals and forms and issues at its output terminal the output signal $V_6(t)=V_2(t) V_3(t)=V_d(t)$, which is the down-count signal. The signals $V_u(t)$ and $V_d(t)$ are carried by two signal lines 95 and 97, respectively, to the up-down counter 55 shown in FIG. 4.

Optionally, a fifth EX-OR gate 89 receives the signals $V_A(t)$ and $V_A(t-\Delta t)$ at its input terminals and forms and issues the output signal $V_7(t)=[V_A(t)\oplus V_A(t-\Delta t)]$ at its output terminal; a sixth EX-OR gate 91 receives the signals $V_B(t)$ and $V_B(t-\Delta t)$ at its input terminals and forms and issues the output signal $V_8(t)=[V_B(t)\oplus V_B(t-\Delta t)]$ at its output terminal; and a third two-input AND gate 93 receives the signals $V_7(t)$ and $V_8(t)$ and forms and issues at its output terminal the output signal $V_9(t)=V_7(t) V_8(t)=V_e(t)$, which is the error signal carried on the signal line 61 in FIG. 3.

Figure 9:
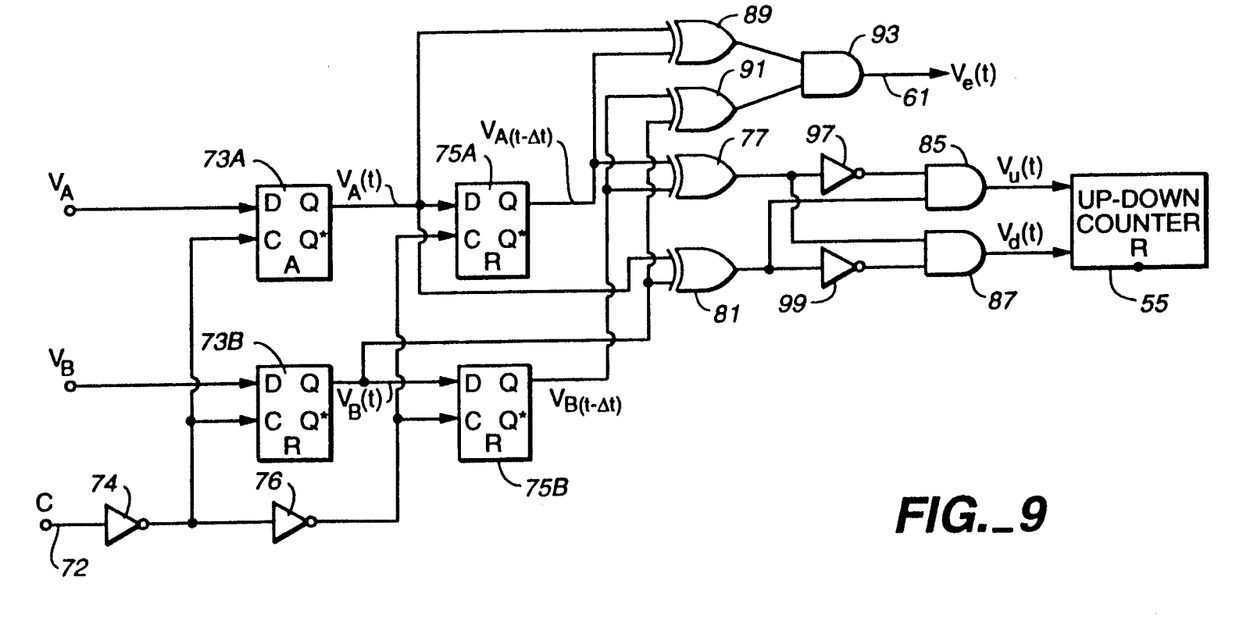

FIG. 9 illustrates an alternative embodiment of the quadrature decoder module 53 and up-down counter 55 in hardware. Here, two signal inverters 97 and 99 receive the signals $[V_A(t-\Delta t)\oplus V_B(t)]$ and $[V_A(t) \oplus V_B(t-\Delta t)]$, respectively, and form and issue the output signals $[V_A(t-\Delta t) \oplus V_B(t)]^*$ and $[V_A(t) \oplus V_B(t-\Delta t)]^*$, respectively. The signals $[V_A(t-\Delta t) \oplus V_B(t)]$ and $[V_A(t) \oplus V_B(t-\Delta t)]^*$ are received at the two input terminals of the AND gate 85, and the product thereof is formed and issued as before. The signals $[V_A(t-\Delta t) \oplus V_B(t)]^*$ and $[V_A(t) \oplus V_B(t-\Delta t)]$ are received at two input terminals of the AND gate 87, and the product thereof is formed and issued as before.

Figure 10:
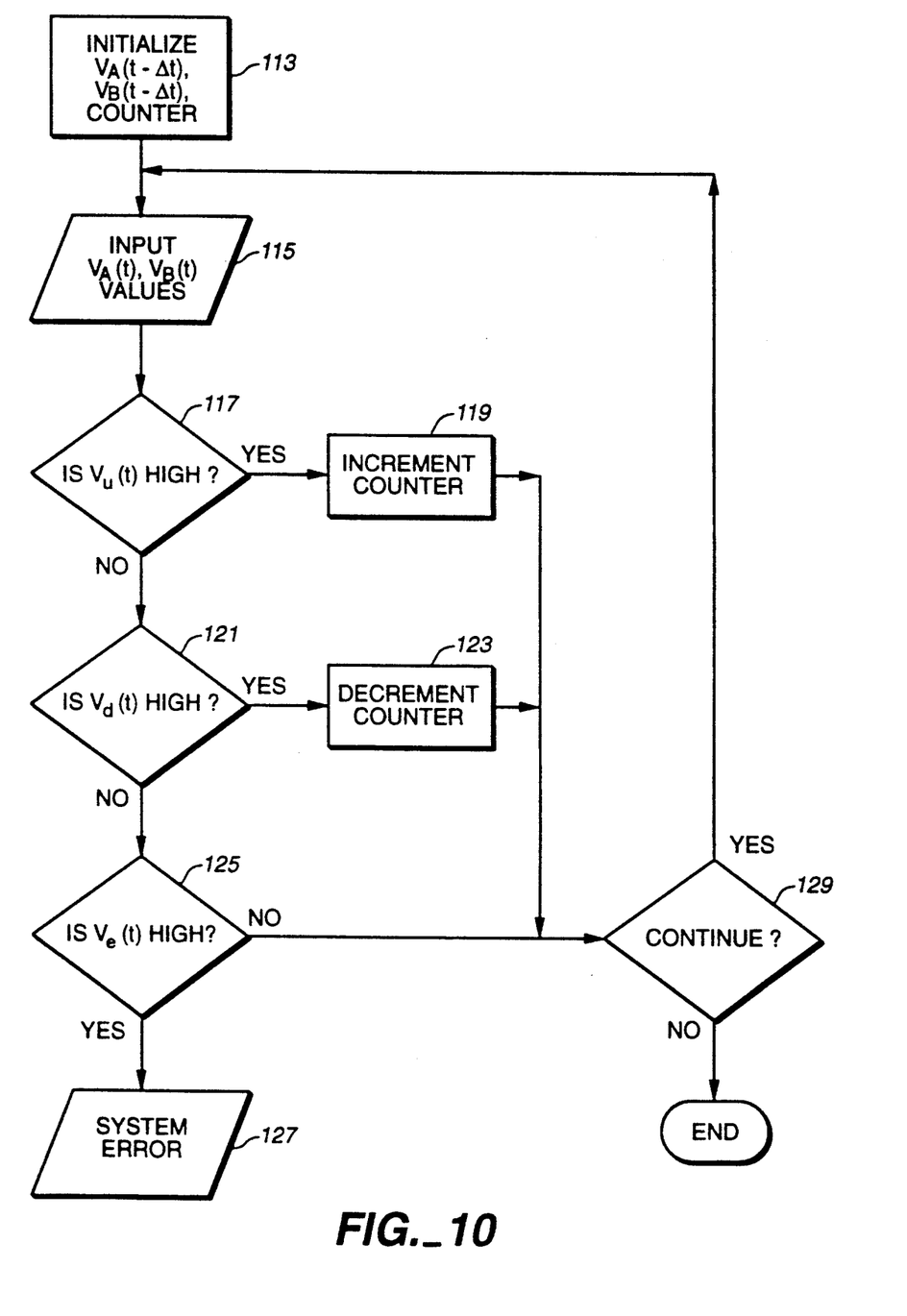

FIG. 10 illustrates a flow diagram used for an embodiment of the quadrature decoder 53 and the up-down counter 55 of FIG. 4 in software. The variables $V_A(t-\Delta t)$ and $V_B(t-\Delta t)$ and counter are initialized in step 113. The distance marker 11 in FIG. 1 begins to move, and the system begins to receive a stream of values $V_A(t)$ and $V_B(t)$ in step 115, which are assumed to be sampled with a time interval $\Delta t$ between consecutive samples. In step 117, the system forms the variable $V_u(t) = [V_A(t) \oplus V_B(t-\Delta t)^*] \cdot [V_A(t-\Delta t) \oplus V_B(t)]$ and determines the present value of $V_u(t)$, high or low. If $V_u(t)$ is high, the system proceeds to step 119, the counter is incremented, and the system proceeds to step 129. If $V_u(t)$ is not high, the system proceeds to step 121, forms the variable $V_d(t) = [V_A(t) \oplus V_B(t-\Delta t)] \cdot [V_A(t-\Delta t)^* \oplus V_B(t)]$, and determines the present value of $V_d(t)$, high or low. If $V_d(t)$ is high, the system proceeds to step 123 and decrements the counter, and proceeds to step 129. If $V_d(t)$ is low, so that neither $V_u(t)$ nor $V_d(t)$ is high, the system proceeds to step 125 and determines the present value of the error signal $V_e(t) = [V_A(t) \oplus V_A(t-\Delta t)] \cdot [V_B(t) \oplus V_B(t-\Delta t)]$. If $V_e(t)$ is high, a system error is present, and the system notifies the user of this in step 127. If $V_e(t)$ is low, no system error is present, and the system proceeds to step 129, where the system determines if the distance marker is still moving and if the system should continue to process incoming values $V_A(t)$ and $V_B(t)$.

Optionally, the rate of change u of extension of the distance marker 11 in FIG. 1 may be computed as $$u = d\Delta_{count}/2k(\Delta t), \quad (8)$$

where $\Delta_{count}$ is the difference in the count that occurs in a time interval $k(\Delta t)$, where k is a positive integer. This is most easily implemented in software but may also be implemented in hardware.

Figure 11:
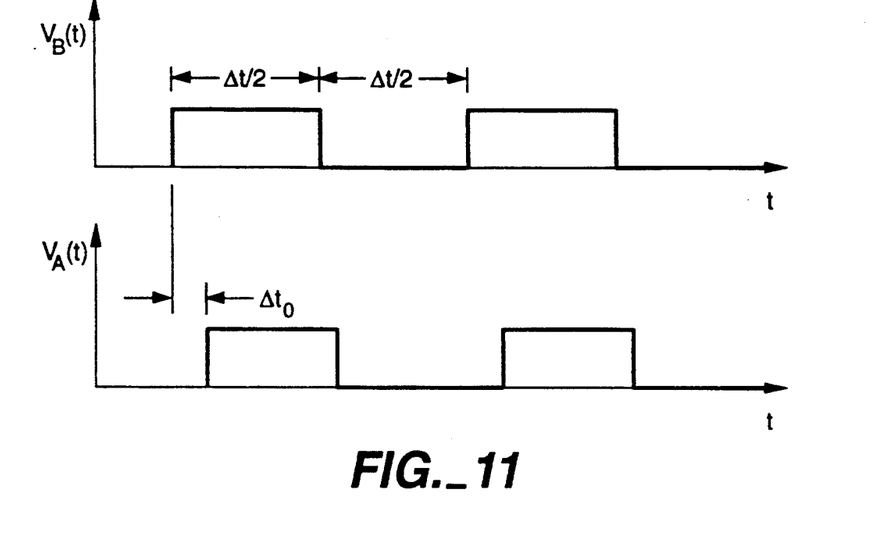
FIGS. 11 and 12 are graphical views illustrating the signals $V_A(t)$ and $V_B(t)$ for two other embodiments of the invention.

The voltage signals $V_A(t)$ and $V_B(t)$ illustrated in FIGS. 7A and 7B have a temporal offset of $\Delta t_o = \Delta t/4$ relative to each other, although this is not required for practice of the invention. FIG. 11 illustrates a pair of voltage signals $V_A(t)$ and $V_B(t)$ with a more general temporal offset $\Delta t_o$ relative to each other, where it is assumed that $$0 < \Delta t_o < \Delta t/2. \quad (9)$$

The spatial resolution R for the embodiment of the invention that incorporates the voltage signals shown in FIG. 11 is limited at the lower end by $$R < w \cdot \max[\Delta t/2 - \Delta t_o, \Delta t_o], \quad (10)$$

where w is the present spatial rate of change of extension of the distance marker. The right side of this inequality achieves its minimum value at $\Delta t_o = \Delta t/4$.

Figure 12:
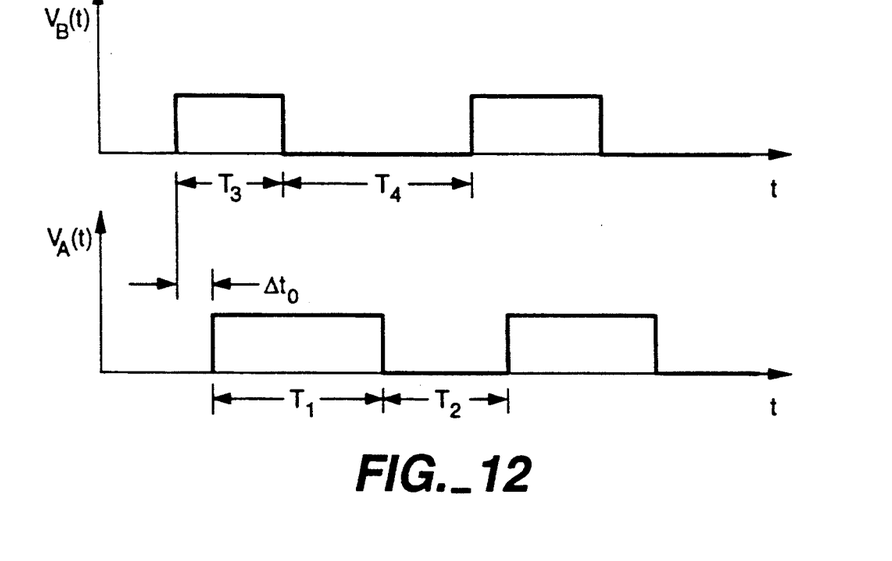

FIGS. 7A, 7B and 11 assume that the duty cycles of the voltage signals $V_A(t)$ and $V_B(t)$ are 50 percents, which is not required for practice of the invention. FIG. 12 illustrates a pair of voltage signals $V_A(t)$ and $V_B(t)$ with general duty cycles $\tau_1/(\tau_1+\tau_2)$ and $\tau_3/(\tau_3+\tau_4)$, respectively, and with a general temporal offset $\Delta t_o$, for which the constraints are $$0 < \Delta t_o < \tau_3, \quad (11)$$

$$\tau_3 < \tau_1 + \Delta t_o, \quad (12)$$

$$\Delta t_o + \tau_1 < \tau_3 + \tau_4, \quad (13)$$

$$\tau_1 + \tau_2 = \tau_3 + \tau_4 = \Delta t. \quad (14)$$

Here, $\tau_1$ and $\tau_2$ are the temporal lengths of the high and low voltage signals for the strip 13 and $\tau_3$ and $\tau_4$ are the temporal lengths of the high and low voltage signals for the strip 15 (FIG. 1). By setting $\tau_1 = \tau_2 = \tau_3 = \tau_4$, the situation in FIG. 11 is implemented. By setting $\tau_1 = \tau_3$ and $\tau_2 = \tau_4$, a new situation is implemented, with identical duty cycles $\tau_1/\tau_1 + \tau_2$) for the two strips 13 and 15 in FIG. 1. The spatial resolution R for the embodiment shown in FIG. 12 is limited at the lower end by $$R \geq w \max[\Delta t_o, \tau_3 - \Delta t_o, \tau_1 - \tau_3 + \Delta t_o, \tau_2 - \Delta t_o], \quad (15)$$

and the right side of this inequality achieves its minimum value for $\Delta t_o = \Delta t/4$, $\tau_1 = \tau_2 = \tau_3 = \tau_4 = \Delta t/2$.

Figure 14A:
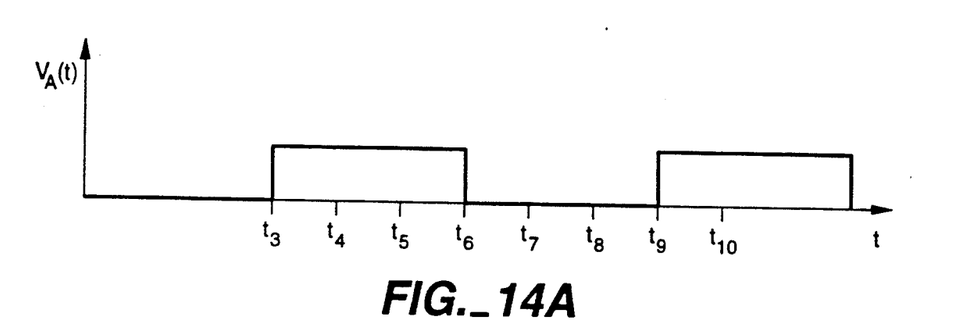
FIGS. 14A, 14B and 14C are graphical views illustrating an arrangement of three voltage signals $V_A(t)$, $V_B(t)$ and $V_C(t)$ that is suitable for practicing the invention of FIG. 12.
Figure 14B:
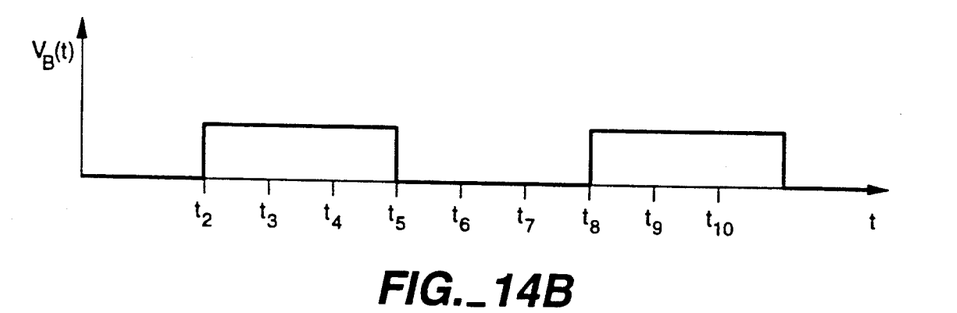
Figure 14C:
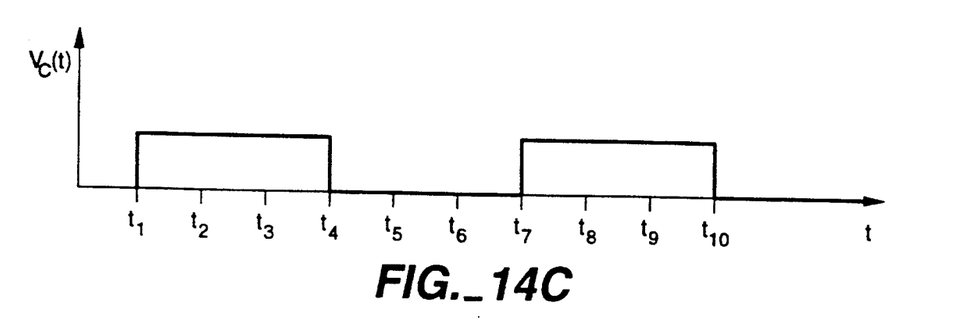

FIG. 13 illustrates a distance marker including a combination of three strips 131, 133 and 135, each having an alternating sequence of light-reflecting (or light-transmitting) and non-reflecting (or non-transmitting) Polygons and separated by optional non-reflecting (or non-transmitting) strips 137 and 139, as indicated. The voltage signals $V_A(t)$, $V_B(t)$ and $V_C(t)$ that would be received on three channels from light sensors that monitor the passing of the Polygons on the respective strips 131, 133 and 135 are illustrated in FIG. 14A, 14B and 14C, where the signal $V_C(t)$ leads the signal $V_B(t)$ by an amount $\Delta t_{BC}$ and the signal $V_B(t)$ leads the signal $V_A(t)$ by an amount $\Delta t_{AB}$, as shown. In a symmetric situation, $\Delta t_{AB} = \Delta t_{BC} = \Delta t_{CA} = \Delta t/6$ and the minimum spatial resolution R becomes $$R(\min) = w \cdot \Delta/6, \quad (16)$$

which is an improvement on the spatial resolution $R = w \Delta t/4$ for the two-strip combination illustrated in FIG. 1. More generally, if N adjacent strips ($N \geq 2$) of alternating light-reflecting (or light-transmitting) and non-reflecting (or non-transmitting) Polygons are used in a configuration analogous to that shown in FIG. 1, the minimum spatial resolution R becomes $$R(\min) = w \cdot \Delta t/2N. \quad (17)$$

The up-count and down-count voltage signals for the number count transitions for the channels A and B, B and C, and C and A are $$V_{uAB}(t) = [V_A(t) \oplus V_B(t-\Delta t)^*] \cdot [V_B(t) \oplus V_A(t-\Delta t)], \quad (18)$$

$$V_{uBC}(t) = [V_B(t) \oplus V_C(t-\Delta t)^*] \cdot [V_C(t) \oplus V_B(t-\Delta t)], \quad (19)$$

$$V_{uCA}(t) = [V_C(t-\Delta t)^*] \cdot [V_A(t) \oplus V_C(t-\Delta t)], \quad (20)$$

$$V_{dAB}(t) = [V_A(t) \oplus V_B(t-\Delta t)] \cdot [V_B(t) \oplus V_A(t-\Delta t)^*], \quad (21)$$

$$V_{dBC}(t) = [V_B(t) \oplus V_C(t-\Delta t)] \cdot [V_C(t) \oplus V_B(t-\Delta t)^*], \quad (22)$$

$$V_{dCA}(t) = [V_C(t) \oplus V_A(t-\Delta t)] \cdot [V_A(t) \oplus V_C(t-\Delta t)^*]. \quad (23)$$

The three up-count voltage signals $V_{uxy}(t)$ (x, y=A, B or C) determine whether the distance marker length shown in FIG. 13 has increased within the last pulse increment of length $\Delta t$ by a length $\tau_1/3$; and the three down-count voltage signals $V_{dxy}(t)$ determine whether the distance marker length has decreased within the last pulse increment by a length $\tau_2/3$. Here $\tau_1$ is the temporal length of a light-reflecting (or light-transmitting) Polygon in FIG. 13 and $\tau_1+\tau_2=\Delta t$. The up-count and down-count signals presented to the up-down counter for the three-strip embodiment are $$V_u(t)=V_{uAB}(t)\oplus V_{uBC}(t) = V_{uBC}(t)\oplus V_{uCA}(t)=V_{uCA}(t)\oplus V_{uAB}(t), \quad (24)$$

$$V_d(t)=V_{dAB}(t)\oplus V_{dBC}(t)=V_{dBC}(t)\oplus V_{dCA}(t)=V_{dCA}(t)\oplus V_{dAB}(t). \quad (25)$$

Three error voltage signals $V_{exy}(t)$ (x, y=A, B or C) are defined analogously, using Eq. (4), and the overall error signal becomes $$V_e(t) = [V_A(t) \oplus V_A(t-\Delta t)] \cdot [V_B(t) \oplus V_B(t-\Delta t)] + [V_B(t) \oplus V_B(t-\Delta t)] \cdot [V_C(t) \oplus V_C(t-\Delta t)] + [V_C(t) \oplus V_C(t-\Delta t)] \cdot [V_A(t) \oplus V_A(t-\Delta t)]. \quad (26)$$

The up-count and down-count signals presented to the up-down counter for an alternative three-strip embodiment is $$V_u(t)=V_{uAB}(t)+V_{uBC}(t)+V_{uCA}(t), \quad (27)$$

$$V_d(t)=V_{dAB}(t)+V_{dBC}(t)+V_{dCA}(t). \quad (28)$$

The number of adjacent strips of alternating Polygons used may be any number $N \geq 2$, and the spatial resolution R for this configuration becomes $$R=w\max[\tau_1/2N, \tau_2/2N]. \quad (29)$$

The electronic signal processing circuit used to receive and analyze the voltage signals $V_A(t)$, $V_B(t)$ and $V_C(t)$ in the embodiment corresponding to the distance marker shown in FIG. 13 is constructed using the full configuration, including the third or C channel, being used in the configuration of FIG. 4. More generally, N such channels would be used in the configuration of FIG. 4, if the distance marker in FIG. 12 contains N adjacent strips of Polygon sequences.

Figure 15:
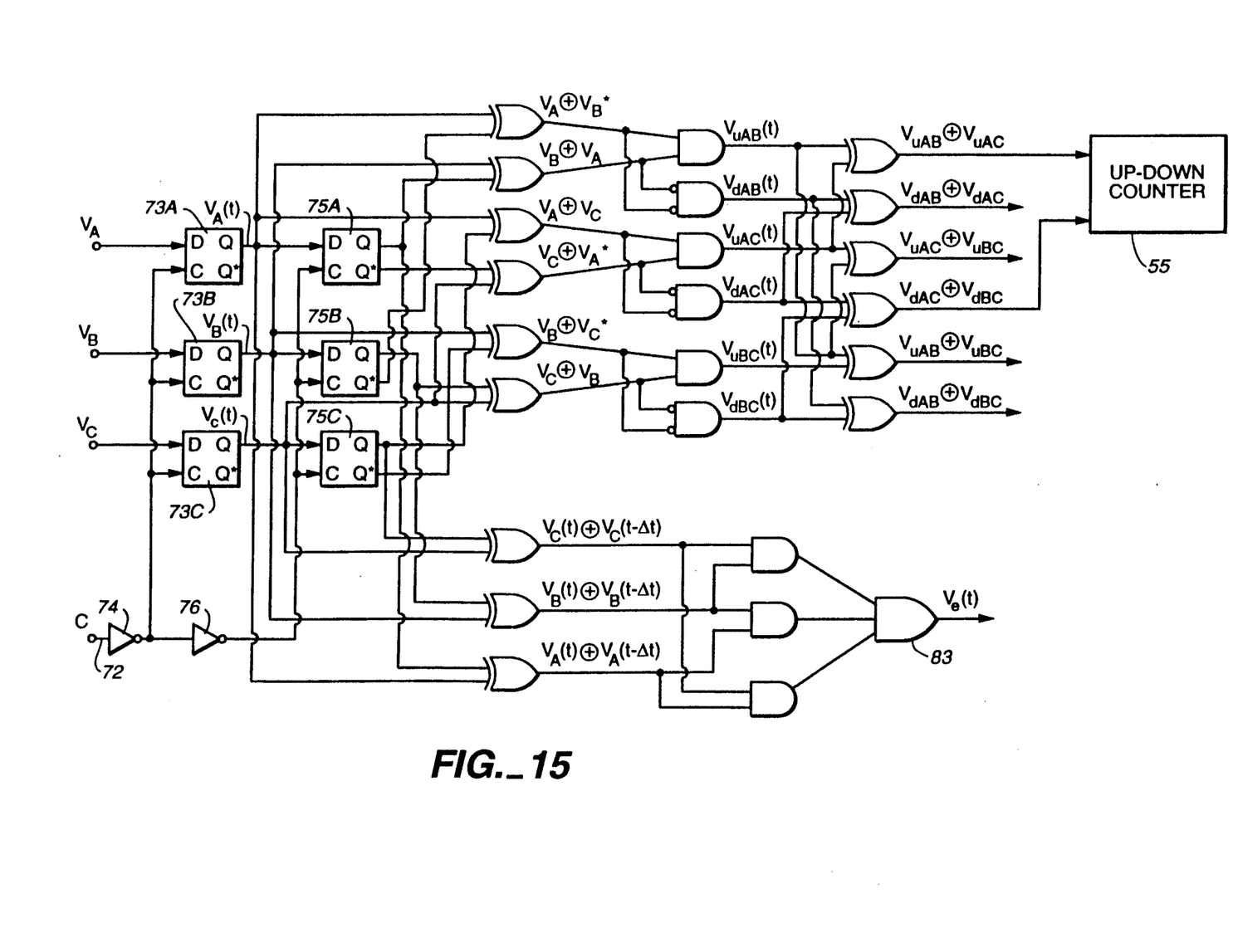
FIG. 15 is a schematic view of a quadrature decoder module, implemented in hardware, corresponding to the three-strip distance marker shown in FIG. 13.

A suitable quadrature decoder module, implemented in hardware, for the three-strip embodiment shown in FIG. 4 is illustrated in FIG. 15. A suitable quadrature decoder module, implemented in software, for the three-strip embodiment shown in FIG. 4 is illustrated in FIG. 10. The embodiment shown in FIGS. 15 operates analogously to the embodiments shown in FIGS. 8 or 9. For definiteness, the up-count signal $[V_{uAB}(t)\oplus V_{uAC}(t)]$ and the down-count signal $[V_{dAC}(t)\oplus V_{dBC}(t)]$ are used to drive the up-down counter 55 in FIG. 15. However, the up-count signal $[V_{uAB}(t)\oplus V_{uAC}(t)]$ may be replaced by either of the other two up-count signals $[V_{uAC}(t)\oplus V_{uBC}(t)]$ or $[V_{uAB}(t)\oplus V_{uBC}(t)]$, and the down count signal $[V_{dAC}(t)\oplus V_{dBC}(t)]$ may be replaced by either of the other two down-count signals $[V_{dAB}(t)\oplus V_{dAC}(t)]$ or $[V_{dAB}(t)\oplus V_{dBC}(t)]$, consistent with Eqs. (24) and (25), with no other changes required in the quadrature decoder module illustrated in FIG. 15.

I claim:

1. Apparatus for determination of a distance or length between two spaced apart positions with an error of no more than 1 mm, the apparatus comprising:

an extendable strip of material having a length L in a strip longitudinal direction, having approximately uniform width, and having first and second sub-strips positioned adjacent to one another and extending in the strip longitudinal direction;

with the first sub-strip having a sequence of light-reflecting Polygons thereon, numbered consecutively m=1,2, ..., M, where each such light reflecting Polygon has a center and has approximately the same shape and same width $d_1$ measured in the strip longitudinal direction, no two light-reflecting Polygons overlap, and Polygon number m (m=2, ..., M−1) is spaced apart from Polygons number m−1 and m+1 along the longitudinal direction of the first sub-strip by a uniform distance $d_2$ measured in the strip longitudinal direction, where $d_1+d_2 \leq 4$ mm, and the portion of the first sub-strip between two consecutive light-reflecting Polygons is a substantially non-reflecting region for incident light;

with the second sub-strip having a sequence of light-reflecting Polygons thereon, numbered consecutively n=1, 2, ..., M where each such light reflecting Polygon has a center and has approximately the same shape and same width $d_3$ measured in the strip longitudinal direction, no two light-reflecting Polygons overlap, and Polygon number n (n=2, ..., M−1) is spaced apart from Polygons number n−1 and n+1 along the longitudinal direction of the first sub-strip by the uniform distance $d_4$, where $d_1+d_2=d_3+d_4$, and the portion of the second sub-strip between two consecutive light-reflecting Polygons is a substantially non-reflecting region for incident light, where the position of light-reflecting Polygon number p of the first sub-strip is translated by a selected distance $d_5$ ($0<d_5<d_3$) relative to the position of light-reflecting Polygon number p of the second sub-strip in the longitudinal direction of the strip;

a first light source positioned adjacent to the first sub-strip to illuminate a region on the first sub-strip that includes at most one of the light-reflecting Polygons of the first sub-strip;

a first light sensor positioned adjacent to the first sub-strip to receive and sense the amount of light that is received by and reflected from the first sub-strip and to issue an electrical voltage output signal indicating the amount of light received by the first light sensor;

a first comparator module to receive a selected first offset voltage signal and the first light sensor output voltage signal at two input terminals thereof, to compare the value of the first light sensor output voltage with the first offset voltage value, to issue as an output signal a first comparator first output signal if the first light sensor output voltage value is greater than the first offset voltage value, and to issue as an output signal a first comparator second output signal if the first light sensor output voltage value is less than the first offset voltage value;

a second light source positioned adjacent to the second sub-strip to illuminate a region on the second sub-strip that includes at most one of the light-reflecting Polygons of the second sub-strip;

a second light sensor positioned adjacent to the second sub-strip to receive and sense the amount of light that is received by and reflected from the second sub-strip and to issue an electrical signal indicating the amount of the light received by the second light sensor;

a second comparator module to receive a selected second offset voltage signal and the second light sensor output voltage signal at two input terminals thereof, to compare the value of the second light sensor output voltage with the second offset voltage value, to issue as an output signal a second comparator first output signal if the second light sensor output voltage value is greater than the second offset voltage value, and to issue as an output signal a second comparator second output signal if the second light sensor output voltage value is less than the second offset voltage value;

a decoder module to receive the output signals from the first and second comparators at first and second input terminals thereof, to receive a sequence of consecutive clock pulses at a third terminal thereof, where each clock pulse is separated from the preceding clock pulse by a selected time interval of fixed length $\Delta t$, to generate and issue as an output signal an up-count signal that counts the number of light-reflecting Polygons, or the number of non-reflecting regions, of each sub-strip that have passed the first and second light sensors moving in a first longitudinal direction and a down-count signal that counts the number of light-reflecting Polygons, or the number of non-reflecting regions, of each sub-strip that have passed the first and second light sensors moving in a second longitudinal direction that is opposite to the first longitudinal direction; and signal display means for receiving the first and second counting signals, for forming the difference of the count represented by the up-count signal and the count represented by the down-count signal and for displaying this difference by a visually perceptible display.

2. The apparatus of claim 1, wherein said distances $d_1$ and $d_3$ are approximately equal and said distances $d_2$ and $d_4$ are approximately equal.

3. The apparatus of claim 2, wherein said distance $d_1$ and $d_2$ are approximately equal.

4. The apparatus of claim 3, wherein said distance $d_5$ is approximately equal to $d_1/2$.

5. The apparatus of claim 1, further comprising a third strip that does not reflect light and that is positioned between said first sub-strip and said second sub-strip.

6. The apparatus of claim 1, wherein the shape of said light-reflecting Polygon for said first sub-strip and for said second sub-strip is selected from the class of shapes consisting of triangles, quadrilaterals and ovals.

7. The apparatus of claim 1, further comprising:

a first peak detector to receive said electrical signal from said first light sensor and to determine and issue the peak voltage value of the most recently received maximum peak voltage of said first sensor output signal as said first offset voltage signal; and a second peak detector to receive said electrical signal from said second light sensor and to determine and issue the peak voltage value of the most recently received maximum peak voltage of said second sensor output signal as said second offset voltage signal.

8. The apparatus of claim 1, wherein said decoder module comprises:

first, second, third and fourth, latch type flipflops, each having a data input terminal, a clock input terminal and first and second output terminals that issue a logical output signal and the logical complement of this logical output signal, respectively, where the clock input terminals of the third and fourth flipflops receive said sequence of clock pulses and the clock input terminals of the first and second flipflops receive the logical complement of said sequence of clock pulses;

where the data input terminals of the first and second flipflops receive said first and second comparator output signals, respectively, and the data input terminals of the third and fourth flipflops receive the logical output signals from the first and second flipflops, respectively;

first, second, third and fourth two-input EX-OR gates, where the first EX-OR gate receives the logical output signals from the second and third flipflops and forms and issues the Exclusive-OR product of the two input signals, where the second EX-OR gate receives the logical output signal from the first flipflop and the logical complement of the logical output signal from the fourth flipflop and forms and issues the Exclusive-OR product of the two input signals, where the third EX-OR gate receives the logical output signals from the first and fourth flipflops and forms and issues the Exclusive-OR product of the two input signals, and where the fourth EX-OR gate receives the logical output signal from the second flipflop and the logical complement of the logical output signal from the third flipflop and forms and issues the Exclusive-OR product of the two input signals;

a first AND gate that receives the output signals from the first and second EX-OR gates and forms and issued the logical product of the two input signals;

a second AND gate that receives the output signals from the third and fourth EX-OR gates and forms and issues the logical product of the two input signals; and an up-down counter that receives the output signals from the first and second AND gates and determines said numbers of light-reflecting regions and non-reflecting regions of each of said sub-strips that have passed said first and second light sensors moving in said first longitudinal direction and said number of light-reflecting regions and non-reflecting regions of each of said sub-strips that have passed said first and second light sensors moving in said first second longitudinal direction.

9. The apparatus of claim 1, wherein said decoder module comprises a computer having an associated counter and a software program that is executable on the computer, where the computer executes the software program by the following actions:

(1) the computer initializes the counter and defines initial values of said variables $V_A$ and $V_B$ by setting $V_A(t=t_0)$ and $V_B(t=t_0)$ equal to selected initial voltage values, where $t_0$ is a selected initial time, and sets an integer $m=0$ initially;

(2) the computer receives said variables $V_A(t)$ and $V_B(t)$ for $t=t_0+m(\Delta t)$ and forms the quantity $V_u(t) = [V_A(t) \oplus V_B(t-\Delta t)^*] \cdot [V_A(t-\Delta t) \oplus V_B(t)]$
and determines whether $V_u(t)$ has a high value or a low value relative to a predetermined intermediate value;

(3) if $V_u(t)$ has a high value, the computer increments the counter by one unit and proceeds to step (9);

(4) if $V_u(t)$ has a low value, the computer forms the quantity $V_d(t) = [V_A(t) \oplus V_B(t-\Delta t)] \cdot [V_A(t-\Delta t)^* \oplus V_B(t)]$ and proceeds to step (5);

(5) if $V_d(t)$ is high, the computer decrements the counter by one unit and proceeds to step (9);

(6) if $V_d(t)$ is low, the computer forms the quantity $V_e(t) = [V_A(t) \oplus V_A(t-\Delta t)] \cdot [V_B(t-\Delta t) \oplus V_B(t)]$;

(7) if $V_e(t)$ is low, the computer proceeds to step (9);

(8) if $V_e(t)$ is high, the computer stops its activity and indicates that a signal error is present;

(9) the computer determines if execution of the software program should continue;

(10) if execution of the software program should continue, the computer replaces the integer m by m+1 and proceeds to step (2); and (11) if execution of the software program should not continue, the computer stops its activity and displays a signal representing the value of the counter, as incremented or decremented, by a visually perceptible display.

10. Apparatus for determination of a distance or length between two spaced apart positions with an error of no more than 1 mm, the apparatus comprising:

an extendable strip of material having a length L in a strip longitudinal direction, having approximately uniform width, and having first and second sub-strips positioned adjacent to one another and extending in the strip longitudinal direction;

with the first sub-strip having a sequence of light-transmitting Polygons thereon, numbered consecutively m=1, 2, ..., M, where each such light-transmitting Polygon has a center and has approximately the same shape and same width $d_1$ measured in the strip longitudinal direction, no two light-transmitting Polygons overlap, and Polygon number m (m=2, ..., M−1) is spaced apart from Polygons number m−1 and m+1 along the longitudinal direction of the first sub-strip by a uniform distance $d_2$ measured in the strip longitudinal direction, where $d_1+d_2 \leq 4$ mm, and the portion of the first sub-strip between two consecutive light-transmitting Polygons is a substantially non-transmitting region for incident light;

with the second sub-strip having a sequence of light-transmitting Polygons thereon, numbered consecutively n=1, 2, ..., M where each such light-transmitting Polygon has a center and has approximately the same shape and same width $d_3$ measured in the strip longitudinal direction, no two light-transmitting Polygons overlap, and Polygon number n (n=2, ..., M−1) is spaced apart from Polygons number n−1 and n+1 along the longitudinal direction of the first sub-strip by the uniform distance $d_4$, where $d_1+d_2=d_3+d_4$, and the portion of the second sub-strip between two consecutive light-transmitting Polygons is a substantially non-transmitting region for incident light, where the position of light-transmitting Polygon number p of the first sub-strip is translated by a selected distance $d_5$ ($0<d_5<d_3$) relative to the position of light-transmitting Polygon number p of the second sub-strip in the longitudinal direction of the strip;

a first light source positioned adjacent to the first sub-strip to illuminate a region on the first sub-strip that includes at most one of the light-transmitting Polygons of the first sub-strip;

a first light sensor positioned adjacent to the first sub-strip to receive and sense the amount of light that is received by and transmitted through the first sub-strip and to issue an electrical output signal indicating the amount of light received by the first light sensor;

a first comparator module to receive a selected first offset voltage signal and the first light sensor output voltage signal at two input terminals thereof, to compare the value of the first light sensor output voltage with the first offset voltage value, to issue as an output signal a first comparator first output signal if the first light sensor output voltage value is greater than the first offset voltage value, and to issue as an output signal a first comparator second output signal if the first light sensor output voltage value is less than the first offset voltage value;

a second light source positioned adjacent to the second sub-strip to illuminate a region on the second sub-strip that includes at most one of the light-transmitting Polygons of the second sub-strip;

a second light sensor positioned adjacent to the second sub-strip to receive and sense the amount of light that is received by and transmitted through the second sub-strip and to issue an electrical signal indicating the amount of light received by the second light sensor;

a second comparator module to receive a selected second offset voltage signal and the second light sensor output voltage signal at two input terminals thereof, to compare the value of the second light sensor output voltage with the second offset voltage value, to issue as an output signal a second comparator first output signal if the second light sensor output voltage value is greater than the second offset voltage value, and to issue as an output signal a second comparator second output signal if the second light sensor output voltage value is less than the second offset voltage value;

a decoder module to receive the output signals of the first and second comparators at first and second input terminals thereof, to receive a sequence of consecutive clock pulses at a third terminal thereof, where each clock pulse is separated from the preceding clock pulse by a selected time interval of fixed length $\Delta t$, to generate and issue as an output signal an up-count signal that counts the number of light-transmitting Polygons, or the number of non-transmitting regions, of each sub-strip that have passed the first and second light sensors moving in a first longitudinal direction and a down-count signal that counts the number of light-transmitting Polygons, or the number of non-transmitting regions, of each sub-strip that have passed the first and second light sensors moving in a second longitudinal direction that is opposite to the first longitudinal direction; and signal display means for receiving the first and second counting signals, for forming the difference of the count represented by the up-count signal and the count represented by the down-count signal and for displaying this difference by a visually perceptible display.

11. The apparatus of claim 10, wherein said distances $d_1$ and $d_3$ are approximately equal and said distances $d_2$ and $d_4$ are approximately equal.

12. The apparatus of claim 11, wherein said distances $d_1$ and $d_2$ are approximately equal.

13. The apparatus of claim 12, wherein said distance $d_5$ is approximately equal to $d_1/2$.

14. The apparatus of claim 10, further comprising a third strip that does not transmit light and that is positioned between said first sub-strip and said second sub-strip.

15. The apparatus of claim 10, wherein the shape of said light-transmitting Polygon for said first sub-strip and for said second sub-strip is selected from the class of shapes consisting of triangles, quadrilaterals and ovals.

16. The apparatus of claim 10, further comprising:
   a first peak detector to receive said electrical signal from said first light sensor and to determine and issue the peak voltage value of the most recently received maximum peak voltage of said first sensor output signal as said first offset voltage signal; and
   a second peak detector to receive said electrical signal from said second light sensor and to determine and issue the peak voltage value of the most recently received maximum peak voltage of said second sensor output signal as said second offset voltage signal.

17. The apparatus of claim 10, wherein said decoder module comprises:
   first, second, third and fourth, latch type flipflops, each having a data input terminal, a clock input terminal and first and second output terminals that issue a logical output signal and the logical complement of this logical output signal, respectively, where the clock input terminals of the third and fourth flipflops receive said sequence of clock pulses and the clock input terminals of the first and second flipflops receive the logical complement of said sequence of clock pulses;
   where the data input terminals of the first and second flipflops receive said first and second comparator output signals, respectively, and the data input terminals of the third and fourth flipflops receive the logical output signals from the first and second flipflops, respectively;
   first, second, third and fourth two-input EX-OR gates, where the first EX-OR gate receives the logical output signals from the second and third flipflops and forms and issues the Exclusive-OR product of the two input signals, where the second EX-OR gate receives the logical output signal from the first flipflop and the logical complement of the logical output signal from the fourth flipflop and forms and issues the Exclusive-OR product of the two input signals, where the third EX-OR gate receives the logical output signals from the first and fourth flipflops and forms and issues the Exclusive-OR product of the two input signals, and where the fourth EX-OR gate receives the logical output signal from the second flipflop and the logical complement of the logical output signal from the third flipflop and forms and issues the Exclusive-OR product of the two input signals;
   a first AND gate that receives the output signals from the first and second EX-OR gates and forms and issued the logical product of the two input signals;
   a second AND gate that receives the output signals from the third and fourth EX-OR gates and forms and issues the logical product of the two input signals; and
   an up-down counter that receives the output signals from the first and second AND gates and determines said numbers of light-transmitting regions and non-transmitting regions of each of said sub-strips that have passed said first and second light sensors moving in said first longitudinal direction and said number of light-transmitting regions and non-transmitting regions of each of said sub-strips that have passed said first and second light sensors moving in said second longitudinal direction.

18. The apparatus of claim 10, wherein said decoder module comprises a computer having an associated counter and a software program that is executable on the computer, where the computer executes the software program by the following actions:
   (1) the computer initializes the counter and defines initial values of said variables $V_A$ and $V_B$ by setting $V_A(t=t_0)$ and $V_B(t=t_0)$ equal to selected initial voltage values, where $t_0$ is a selected initial time, and sets an integer $m=0$ initially;
   (2) the computer receives said variables $V_A(t)$ and $V_B(t)$ for $t=t_0+m(\Delta t)$ and forms the quantity
   $V_u(t)=[V_A(t)\oplus V_B(t-\Delta t)^*]\cdot[V_A(t-\Delta t)\oplus V_B(t)]$
   and determines whether $V_u(t)$ has a high value or a low value relative to a predetermined intermediate value;
   (3) if $V_u(t)$ has a high value, the computer increments the counter by one unit and proceeds to step (9);
   (4) if $V_u(t)$ has a low value, the computer forms the quantity $V_d(t)=[V_A(t)\oplus V_B(t-\Delta t)]\cdot[V_A(t-\Delta t)^*\oplus V_B(t)]$ and proceeds to step (5);
   (5) if $V_d(t)$ is high, the computer decrements the counter by one unit and proceeds to step (9);
   (6) if $V_d(t)$ is low, the computer forms the quantity $V_e(t)=[V_A(t)\oplus V_A(t-\Delta t)]\cdot[V_B(t-\Delta t)\oplus V_B(t)]$;
   (7) if $V_e(t)$ is low, the computer proceeds to step (9);
   (8) if $V_e(t)$ is high, the computer stops its activity and indicates that a signal error is present;
   (9) the computer determines if execution of the software program should continue;
   (10) if execution of the software program should continue, the computer replaces the integer m by m+1 and proceeds to step (2); and
   (11) if execution of the software program should not continue, the computer stops its activity and displays a signal representing the value of the counter, as incremented or decremented, by a visually perceptible display.

* * * * *